Oct. 23, 1945. M. A. MORIARTY 2,387,340
HUMIDIFIED FLOWERPOT OR CONTAINER
Filed July 10, 1944

Inventor
Mary A. Moriarty,

Patented Oct. 23, 1945

2,387,340

UNITED STATES PATENT OFFICE 2,387,340

HUMIDIFIED FLOWERPOT OR CONTAINER

Mary A. Moriarty, Naugatuck, Conn.

Application July 10, 1944, Serial No. 544,187

4 Claims. (Cl. 47—38)

This invention relates to flower pots or containers, and has for the primary object the provision of a device of this character which will be much improved in serviceability and the proper growth of plants and the like over that provided by clay pots and other types of pots now on the market.

Another object of this invention is the provision of an improved means for draining and aerating the soil within the device to prevent the soil from souring or becoming unfit for the proper nourishment of the plant.

A further object of this invention is the provision of means for the efficient watering of the plant and the providing of humidity for the plant found to be very important in plant culture.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a top plan view illustrating a flower pot constructed in accordance with my invention.

Figure 2 is a vertical sectional view taken on the line 2—2 of Figure 1.

Figure 3 is a sectional view taken on the line 3—3 of Figure 2.

Referring in detail to the drawing, the numeral 5 indicates as an entirety a flower pot composed primarily of a base 6 and inner and outer walls 7 and 8. The base 6 has an upwardly flared outer annular flange 6' and the walls 7 and 8 terminate flush with each other at the upper end of the pot 5 and the wall 8 extends for a greater distance downwardly than the inner wall 7 and is formed on the bottom of the base 6, and is provided with a series of openings 9 located adjacent the bottom wall of the base. The openings 9, as shown, are located contiguous to the base 6 and they are relatively large but of a diameter so that their tops are some distance below the top edge of the base. A horizontal partition wall 10 is formed on the outer wall and the lower end of the inner wall 7 and is provided centrally of the inner wall with a relatively large drain opening 11 and a series of smaller perforations 12 surrounding the opening 11.

The partition wall 10 is spaced a distance from the bottom wall of the base as well as from the openings 9 of the outer wall which allows a free circulation of air underneath the inner wall 7.

The inner wall 7 defines a soil-receiving space in which the plant or the like, or the roots thereof, is arranged.

Series of partitions 13 are arranged between the inner and outer walls 7 and 8 and are integral therewith as well as with the horizontal partition wall 10 and form a plurality of flues or passages preferably arranged, as shown in Figure 3, in groups of three flues or passages. The flues or passages 14 of each group are for the purpose of aerating the soil and the horizontal partition wall 14' thereunder is provided with series of perforations 15. Also the inner wall 7 is provided with perforations 16 connecting the flues or passages 14 with the soil space defined by the inner wall 7 and the horizontal wall 10. The flues or passages 17 arranged between the pairs of passages 14 have no apertures in the walls or bottom thereof. They are provided for the purpose of containing water to provide humidity to the growing plant through evaporation from the open tops and the condensation occurring on the side walls of the flues.

The partitions 13 grouped as described and shown in Figure 3 besides forming the vertically arranged passages or flues 14 and 17, also form watering chambers 19 of relatively large proportions and having direct communication with the interior of the flower pot by perforations 20 formed in the inner wall. The watering chambers 19 are adapted to be filled with water so that the water may pass through the passages 20 to the soil and be taken up by the roots of the plant therein as needed. While a selected number of flues or passages are shown in Figure 3 of the drawing, it is to be understood that the number may be easily varied by increasing and decreasing the number of partitions in the construction of the pot. It is also obvious that the sizes of the side wall and bottom partition openings may be varied in some cases. Further, it is to be understood that the pot in its entirety may be constructed of any material suitable for the purpose, preferably of a material which will be non-breakable and non-absorbent of moisture and not have any damaging effect on the soil arranged within the pot.

Further, it will be seen that a thorough and complete drainage of the soil is provided at all times by the opening 11 and perforations 12 formed in the horizontal partition wall 10. Also, it will be seen that due to the arrangement of the openings 9, perforations 15 and 16, a thorough and complete aeration of the soil will be had. With the arrangement of the water chambers 19 and apertures 20 the water may be fed into the soil adjacent to the roots so that they may take up as much water as proper for the efficient growth of the plant, while the surplus water may drain therefrom into the base through the opening 11 and apertures 20, the base preferably being of saucer-shape as clearly shown in Figures 2 and 3. It is very important in the growth of plants to supply the plants with humidity and this is easily taken care of by the humidifying chambers 17 which may be completely or partly filled with water and more particularly at such time that no water is contained within the chambers 19, either through oversight or in instances when none is desired or needed.

A flower pot of the construction described and shown in the drawing may be manufactured and sold at a low cost and will have the enumerated advantages to assure the proper growth of a plant over that possessed by flower pots now commonly used. It is further noted that with a pot constructed and arranged in accordance with the present invention, a more complete control of the growth of a plant is possible.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a flower pot, vertical and horizontal walls coacting to provide a soil chamber with a horizontal wall protruding beyond the vertical wall and provided with drain openings, an outer vertical wall surrounding the first-named vertical wall and spaced therefrom and formed on the horizontal wall and terminating in a plane below the latter, and groups of partitions connecting the first and second-named vertical walls and the horizontal wall and providing air circulating flues, water chambers and humidity chambers all terminating flush with the upper ends of the first and second-named walls, said first-mentioned vertical wall having perforations connecting with the air circulating flues and with certain of the water chambers.

2. In a flower pot, substantially vertical and horizontal walls coacting to provide a soil chamber with the horizontal wall forming the bottom of said chamber and extending outwardly and annularly of the vertical wall of said chamber and provided with drain openings, an outer substantially vertical wall spaced annularly from and surrounding the first-named substantially vertical wall and formed in water and air-tight attachment with the outer edge portion of said outward and annular extension of said horizontal wall and terminating with its lower end in a plane below said horizontal wall, and groups of radial partitions connecting the first and second-named substantially vertical walls and the horizontal wall, and thus providing separate air circulating flues, water chambers and humidity chambers surrounding said soil chamber and each and all of said flues and chambers terminating substantially flush with the upper ends of said first and second-named walls, and said first-mentioned substantially vertical wall having perforations connecting with the air circulating flues and with certain of the water chambers.

3. In a flower pot, annularly spaced-apart and substantially vertically arranged inner and outer walls and a horizontal wall connecting substantially integrally with the inner wall at the lower end of the latter and with the outer wall above the lower end of the same, said outer wall having openings therein below the horizontal wall, said horizontal wall having drain openings therein, said inner wall coacting with the horizontal wall in forming a soil chamber with the horizontal wall constituting the bottom of the chamber and the drain openings of said wall being all within the chamber, groups of radial partitions arranged between the inner and outer walls and connected substantially integrally thereto and to the horizontal wall and thus forming water-containing chambers to provide water and humidity for a plant growing in the soil contained in said chamber, and aerating passages for the aeration of said contained soil, said inner wall having perforations connecting with the water supplying chambers and with the aerating passages, said horizontal wall having perforations outside of said soil chamber and connecting with the aerating passages, said perforations of the inner wall being located in close proximity to the horizontal wall.

4. A flower pot constructed and arranged in the combination of parts as set forth in claim 3, and further including a saucer-like base integral with and supporting the lower end of the outer wall and extending outwardly and annularly of said wall, the central body portion of said base in conjunction with said adjacent outer wall portion and the horizontal wall thereabove providing an air and drainage chamber.

MARY A. MORIARTY.